(12) United States Patent
Wakuda

(10) Patent No.: US 10,496,173 B2
(45) Date of Patent: Dec. 3, 2019

(54) MANIPULATION FEELING IMPARTING INPUT DEVICE

(71) Applicant: Alps Alpine Co., Ltd., Ota-ku, Tokyo (JP)

(72) Inventor: Hiroshi Wakuda, Miyagi-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 82 days.

(21) Appl. No.: 15/829,443

(22) Filed: Dec. 1, 2017

(65) Prior Publication Data

US 2018/0081446 A1    Mar. 22, 2018

Related U.S. Application Data

(63) Continuation of application No. PCT/JP2016/065165, filed on May 23, 2016.

(30) Foreign Application Priority Data

Jul. 16, 2015 (JP) .................................. 2015-141831

(51) Int. Cl.
  *G06F 3/01*   (2006.01)
  *G06F 3/0354* (2013.01)
  *G06F 3/044*  (2006.01)

(52) U.S. Cl.
  CPC .......... *G06F 3/016* (2013.01); *G06F 3/03547* (2013.01); *G06F 3/044* (2013.01)

(58) Field of Classification Search
  CPC ........ G06F 3/016; G06F 3/03547; G06F 3/02; G06F 3/0213; G06F 3/03; G06F 3/044
  See application file for complete search history.

(56) References Cited

U.S. PATENT DOCUMENTS

| 2002/0149561 A1* | 10/2002 | Fukumoto ........... G01C 21/3664 345/156 |
| 2007/0035526 A1 | 2/2007 | Takenaka et al. |
| 2007/0262968 A1 | 11/2007 | Ohshita et al. |

FOREIGN PATENT DOCUMENTS

| JP | 2007-026344 | 2/2007 |
| JP | 2007-304757 | 11/2007 |

(Continued)

OTHER PUBLICATIONS

International Search Report from International Application No. PCT/JP2016/064265 dated Jul. 19, 2016.

(Continued)

*Primary Examiner* — Charles V Hicks
(74) *Attorney, Agent, or Firm* — Beyer Law Group LLP

(57) ABSTRACT

A manipulation feeling imparting input device has: a flat-type input, having a manipulation surface manipulated by a specific body region such as a user's fingertip, that outputs input information made by a manipulation performed on the manipulation surface; a support member that supports the input unit so as to be able to reciprocate in a pressing direction in response to a pressing manipulation performed on the input unit; and a vibration generating unit, connected to the input unit, that imparts vibration. The vibration generating unit has a vibration generating member having a movable part operable in a vibration direction; a vibration transmitting member connected to the movable part; and a base body that holds the vibration generating member. Vibration is imparted to the input unit when it is manipulated. The pressing direction of the pressing manipulation and the vibration direction in which vibration is imparted cross each other.

9 Claims, 11 Drawing Sheets

(56) References Cited

FOREIGN PATENT DOCUMENTS

| | | |
|---|---|---|
| JP | 2014-123275 | 7/2014 |
| JP | 2014-146208 | 8/2014 |
| WO | 2012-067178 | 5/2012 |

OTHER PUBLICATIONS

Supplementary European Search Report dated Jan. 22, 2019 for European Application No. 16824151.

* cited by examiner

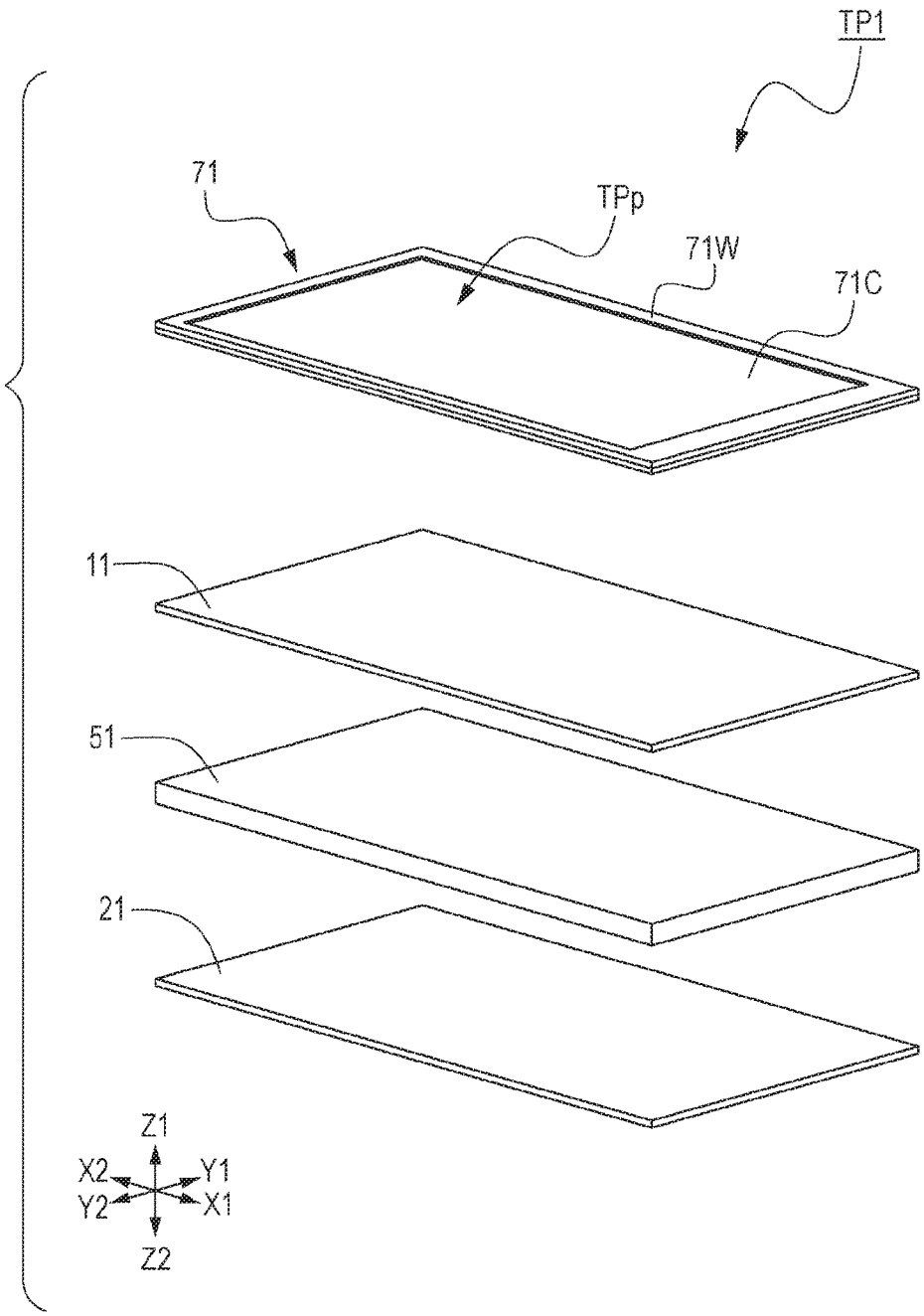

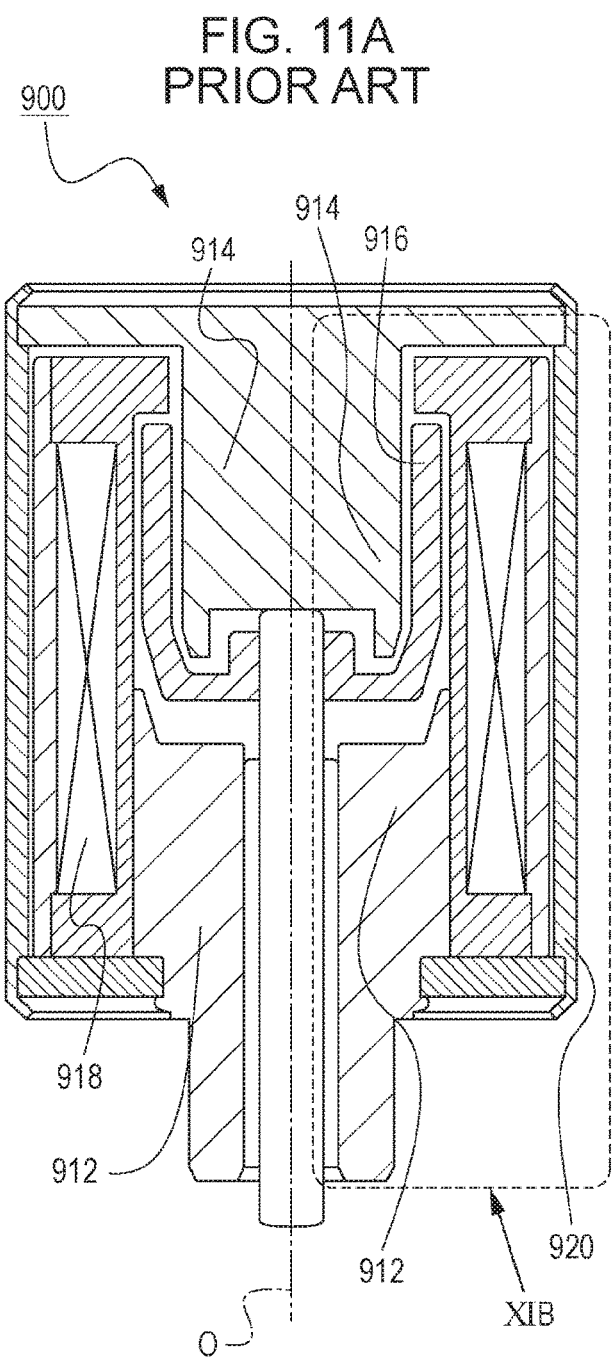
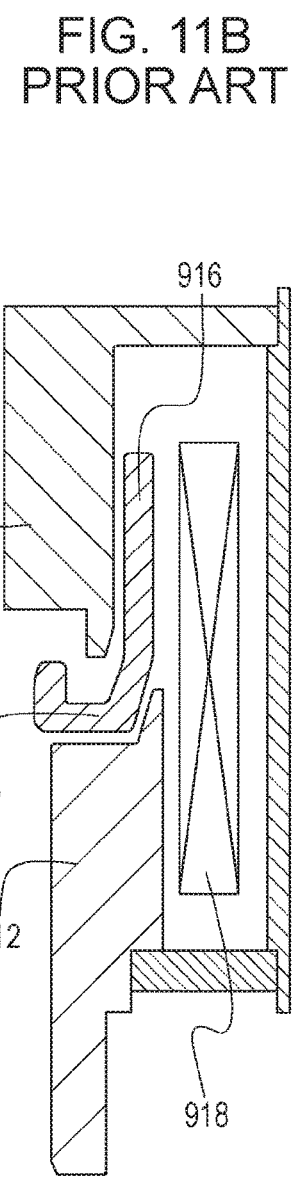
FIG. 11A
PRIOR ART
FIG. 11B
PRIOR ART

MANIPULATION FEELING IMPARTING INPUT DEVICE

CLAIM OF PRIORITY

This application is a Continuation of International Application No. PCT/JP2016/065165 filed on May 23, 2016, which claims benefit of Japanese Patent Application No. 2015-141831 filed on Jul. 16, 2015. The entire contents of each application noted above are hereby incorporated by reference.

BACKGROUND OF THE INVENTION

1. Field of the Invention

The present invention relates to an input device used in various types of electronic units, and more particularly to a manipulation feeling imparting input device configured so that a manipulation feeling is imparted to a flat-type input device.

2. Description of the Related Art

In the electronic unit field, flat-type input devices (input units) such as touch pads and touch panels have come into widespread use in recent years. This type of flat-type input device is such that when a manipulator (user) brings a fingertip into contact with the manipulation surface, the input device detects the coordinate position of the fingertip on the manipulation surface according to a change in a capacitance value or the like and enables an input manipulation matching the coordinate position.

As a conventional example of an input device that uses this type of flat-type input device, Japanese Unexamined Patent Application Publication No. 2007-304757 proposes an input device 800 as illustrated in FIGS. 10A and 10B. FIGS. 10A and 10B illustrate the input device 800, which is used in a personal computer, in a first conventional example. FIG. 10A is a plan view of the input device 800, and FIG. 10B is a cross-sectional view taken along line XB-XB indicated in FIG. 10A.

The input device 800 illustrated in FIGS. 10A and 10B includes a keyboard input device 810 composed by regularly arranging many input keys 811 and also includes a complex input unit 820 provided with a capacitive input pad 824 (so-called touch pad) disposed on the surface of a rectangular large key 821. The input device 800 is configured so that when any input key 811 indicated in FIG. 10A is manipulated, its corresponding key switch 812 (see FIG. 10B) arranged on a circuit board 802 can be turned on or off and that a coordinate position can be input by manipulating the surface of the capacitive input pad 824.

As illustrated in FIG. 10B, the complex input unit 820 of the input device 800 includes a support axis 823 (hinge) that rotatably supports the large key 821, a reinforcing spring 825 that is disposed between the large key 821 and the circuit board 802 and urges the large key 821, and a detection switch 822 that is a mechanically operating push switch disposed between the large key 821 and the circuit board 802. In addition to an input of a coordinate position, the complex input unit 820 of the input device 800 is configured so that when the large key 821 is pressed to have the detection switch 822 operate, the detection switch 822 can be selectively turned on and off.

With this type of flat-type input device (in the first conventional example, equivalent to the complex input unit 820), when the user manipulates the input device by bringing the user's fingertip into contact with the manipulation surface, a difference in sense transmitted to the fingertip does not occur between before and after the manipulation (input), so the user has not been able to obtain a manipulation sense (manipulation feeling). In view of this, a feeling stimulus generating device that gives a feeling stimulus (feeling feedback) to the user's fingertip has been conventionally proposed, and there has been a case in which a flat-type input device is used in combination with this feeling stimulus generating device. As a typical example of this feeling stimulus generating device, a type of stimulus generating device that gives vibration to impart a feeling stimulus is most used.

As this vibration type of feeling stimulus generating device, International Publication No. WO2012/067178 proposes an electromagnetic actuator 900 (vibration generating device) as illustrated in FIGS. 11A and 11B. FIGS. 11A and 11B illustrate the electromagnetic actuator 900 in a second conventional example. FIG. 11A is a schematic longitudinal cross-sectional view, and FIG. 11B is a structural diagram on which the main constituent components of a portion XIB indicated in FIG. 11A are extracted.

The electromagnetic actuator 900 illustrated in FIGS. 11A and 11B has: a first fixed iron core 912 and a second fixed iron core 914, which are disposed opposite to each other with a predetermined gap interposed in the direction of an axial line O; a movable iron core 916 disposed so as to be movable along the axial line O in the vicinity of this gap; and a coil 918 that exerts magnetic fields around the two fixed iron cores (first fixed iron core 912 and second fixed iron core 914) and the movable iron core 916 to form magnetic paths in them and move the movable iron core 916 along the axial line O. Basically, these members are formed in a rotationally symmetrical form, that is, in a circular form, and are accommodated in a cylindrical housing 920.

With the electromagnetic actuator 900, when a current is supplied to the coil 918, a magnetic attractive force is generated for the movable iron core 916 from each of the two fixed iron cores (first fixed iron core 912 and second fixed iron core 914). Since the magnetic attractive force on the same side as the first fixed iron core 912 is larger than the magnetic attractive force on the same side as the second fixed iron core 914, the movable iron core 916 moves toward the first fixed iron core 912. Along with the movement of the movable iron core 916 at this time, vibration is generated in the direction of the axial line O (vertical direction).

SUMMARY OF THE INVENTION

However, there has been the problem that if this type of a flat-type input device (complex input unit 820 of the input device 800) that can reciprocate in the pressing direction (vertical direction) is combined with a vibration generating device (electromagnetic actuator 900) that vibrates in the vertical direction, when the flat-type input device reciprocates in the vertical direction, the manipulation surface receives air resistance as in the principle of a speaker and the vibration sound thereby becomes large. Particularly, the larger the area of the flat-type input device is, the more the problem has become noticeable.

The present invention addresses the problem described above by providing a manipulation feeling imparting input device configured so that a vibration sound is suppressed in a flat-type input unit to which an operational feeling caused by vibration is imparted.

To solve this problem, in a manipulation feeling imparting input device that has a flat-type input unit having a manipulation surface manipulated by a specific body region such as a user's fingertip, the input unit being configured to output input information made by a manipulation performed on the manipulation surface, a support member that supports the input unit so as to be able to reciprocate in a pressing direction in response to a pressing manipulation performed on the input unit, and a vibration generating unit that is connected to the input unit and imparts vibration, the vibration generating unit being configured to have a vibration generating member having a movable part operable in a vibration direction, as well as a vibration transmitting member connected to the movable part and a base body that holds the vibration generating member, vibration being imparted to the input unit when the manipulation is performed, the manipulation feeling imparting input device in the present invention is characterized in that the pressing direction and the vibration direction cross each other.

According to this, with the manipulation feeling imparting input device in the present invention, when the input unit is manipulated and the resulting vibration is imparted to the input unit, air resistance to the input unit due to the vibration is received by the side surfaces of the input unit. Thus, since the input unit does not receive the air resistance on the entire flat surface, a vibration sound can be suppressed when compared with the vibration generating device in the conventional example (electromagnetic actuator 900) that vibrates in the vertical direction. Therefore, it is possible to provide the manipulation feeling imparting input device configured so that a vibration sound is suppressed in the flat-type input unit to which a manipulation feeling caused by vibration is imparted.

The manipulation feeling imparting input device in the present invention is characterized in that: the vibration generating member preferably has a first yoke and a second yoke that are placed so as to be spaced in the pressing direction, a coil that is placed in the vicinity of at least one of the first yoke and the second yoke and generates magnetism, and a support body that supports the first yoke so as to be movable in the vibration direction; the first yoke and the second yoke preferably face each other in the pressing direction and preferably have a first gap between a first pressing-side opposite surface of the first yoke and a second pressing-side opposite surface of the second yoke that face each other in the pressing direction; the first yoke and the second yoke preferably face each other in an orthogonal direction orthogonal to the pressing direction and preferably have a second gap between a first orthogonal-side opposite surface of the first yoke and a second orthogonal-side opposite surface of the second yoke that face each other in the orthogonal direction; and the second gap is preferably narrower than the first gap.

According to this, when a current is supplied to the coil, a magnetic attractive force between the first yoke and the second yoke in the second gap becomes strong. Therefore, the first yoke moves faster toward the second yoke in the orthogonal direction in the second gap, so the first yoke vibrates in the orthogonal direction. Therefore, it is possible for the vibration transmitting member to reliably give vibration in the vibration direction, which is the orthogonal direction, to the input unit through the movable part, which is operable in the vibration direction.

The manipulation feeling imparting input device in the present invention is characterized in that a plurality of second gaps are preferably provided in the orthogonal direction.

According to this, the magnetic attractive force between the first yoke and the second yoke in the orthogonal direction can be made stronger. Thus, it is possible to cause the first yoke 13A to vibrate more strongly in the vibration direction, which is the orthogonal direction, and thereby to give stronger vibration to the input unit in the vibration direction.

The manipulation feeling imparting input device in the present invention is characterized in that, in an initial state in which no magnetic attractive force is generated, the opposite areas of the first orthogonal-side opposite surface and second orthogonal-side opposite surface are preferably larger than the opposite areas of the first pressing-side opposite surface and second pressing-side opposite surface.

According to this, when a current is supplied to the coil, the magnetic attractive force between the first yoke and the second yoke in the orthogonal direction (in the second gap) becomes stronger. Thus, the first yoke moves even faster toward the second yoke in the orthogonal direction, so the first yoke vibrates more strongly in the orthogonal direction. Therefore, it is possible for the vibration transmitting member to give even stronger vibration in the vibration direction, which is the orthogonal direction, to the input unit TP1 through the movable part, which is operable in the vibration direction (orthogonal direction).

The manipulation feeling imparting input device in the present invention is characterized in that even when a magnetic attractive force is generated, the opposite areas of the first pressing-side opposite surface and second pressing-side opposite surface are preferably the same as in the initial state in which no magnetic attractive force is generated.

According to this, the area of a portion that has an effect of mainly inducing a magnetic flux remains unchanged and is not thereby reduced. Therefore, the magnetic resistance of this portion is not lowered, so the magnetic attractive force between the first yoke and the second yoke in the second gap is stabilized.

The manipulation feeling imparting input device in the present invention is characterized in that the outside shapes of the first yoke and second yoke are preferably circular in a plan view.

According to this, when the first yoke and second yoke are assembled so that they face each other, even if their mutual positional relationship is slightly deviated from a desired positional relationship due to tolerances in part manufacturing and the like, deviation in a particular direction is lessened, so vibration with less eccentricity can be obtained.

The manipulation feeling imparting input device in the present invention is characterized in that the input unit is preferably connected integrally to the vibration transmitting member.

According to this, vibration generated by the vibration generating unit is efficiently transmitted directly to the input unit. Thus, an even stronger manipulation feeling is imparted to the input unit.

With the manipulation feeling imparting input device in the present invention, when the input unit is manipulated and vibration is imparted to the input unit, air resistance to the input unit due to vibration is received by the side surfaces of the input unit. Therefore, since the input unit does not receive the air resistance on the whole of the flat surface, a vibration sound can be suppressed when compared with the conventional vibration generating device that vibrates in the vertical direction.

BRIEF DESCRIPTION OF THE DRAWINGS

FIG. 3 is an exploded perspective view of the input unit according to the first embodiment of the present invention;

FIGS. 11A and 11B each illustrate an electromagnetic actuator in a second conventional example, FIG. 11A being a schematic longitudinal cross-sectional view, FIG. 11B being a structural diagram illustrating the main constituent components extracted from a portion XIB indicated in FIG. 11A.

DESCRIPTION OF THE PREFERRED EMBODIMENT

An embodiment of the present invention will be described below with reference to the drawings.

First Embodiment

Figure 1:
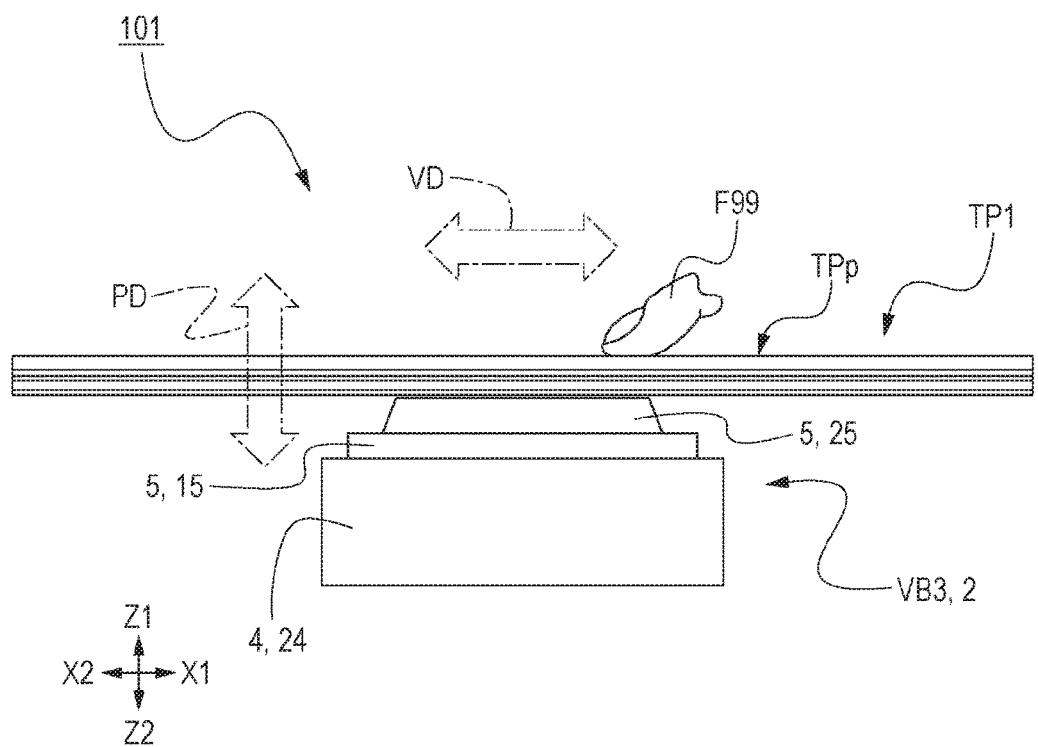
FIG. 1 is a side-surface structural diagram illustrating a manipulation feeling imparting input device in a first embodiment of the present invention.

FIG. 1 is a side-surface structural diagram illustrating a manipulation feeling imparting input device 101 in a first embodiment of the present invention.

As illustrated in FIG. 1, the manipulation feeling imparting input device 101 in the first embodiment of the present invention includes a flat-type input unit TP1 that has a manipulation surface TPp manipulated by a specific body region F99 such as a user's fingertip, a support member 2 that supports the input unit TP1 so as to be able to reciprocate in a pressing direction PD (Z direction indicated in FIG. 1) in response to a pressing manipulation performed on the input unit TP1, and a vibration generating unit VB3 that is connected to the input unit TP1 and imparts vibration to the input unit TP1. Furthermore, the manipulation feeling imparting input device 101 in the first embodiment has a switch member SW6 (see FIG. 6) that is turned on and off by a pressing manipulation performed on the input unit TP1 and a wiring board 90 on which the switch member SW6 is mounted.

Figure 2A:
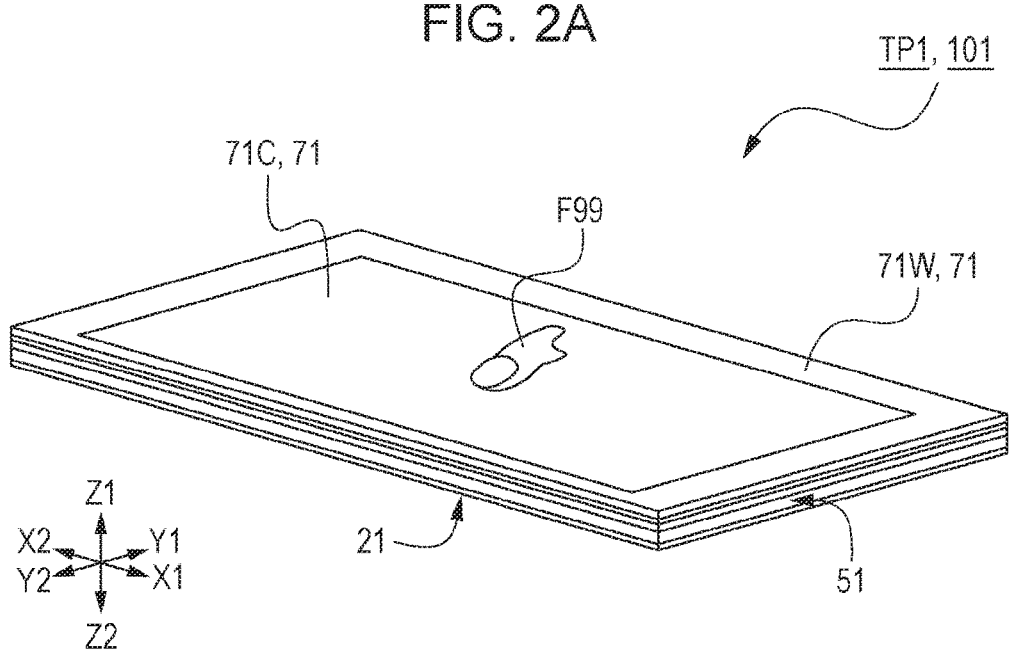
FIGS. 2A and 2B each are a structural diagram illustrating an input unit included in the manipulation feeling imparting input device according to the first embodiment of the present invention, FIG. 2A being a perspective view of the input unit, FIG. 2B being a top view as viewed from the Z1 side indicated in FIG. 2A.
Figure 2B:
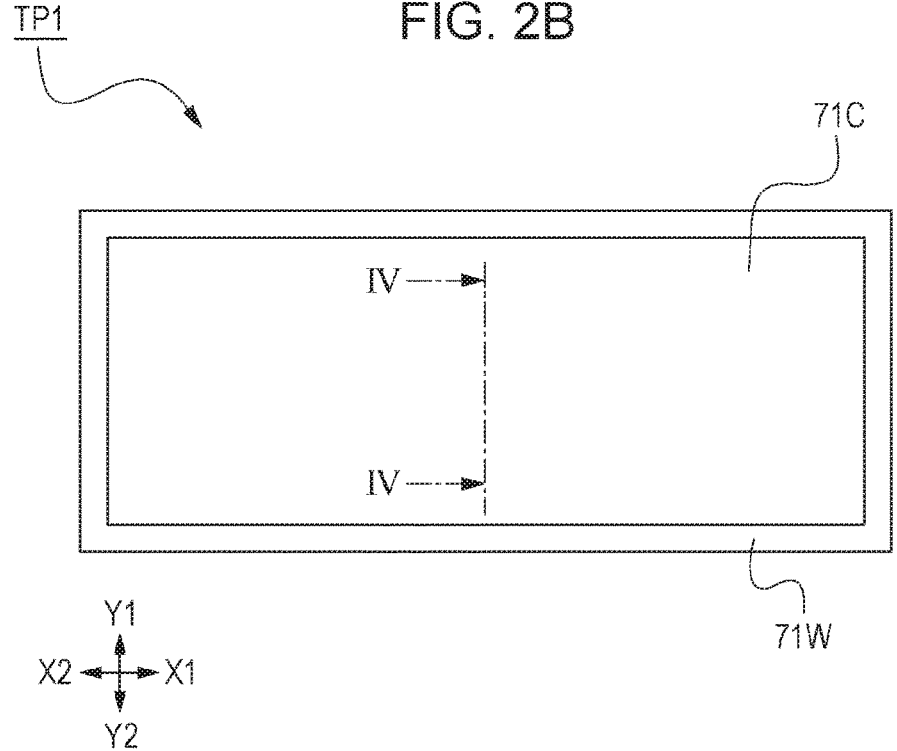
Figure 4:
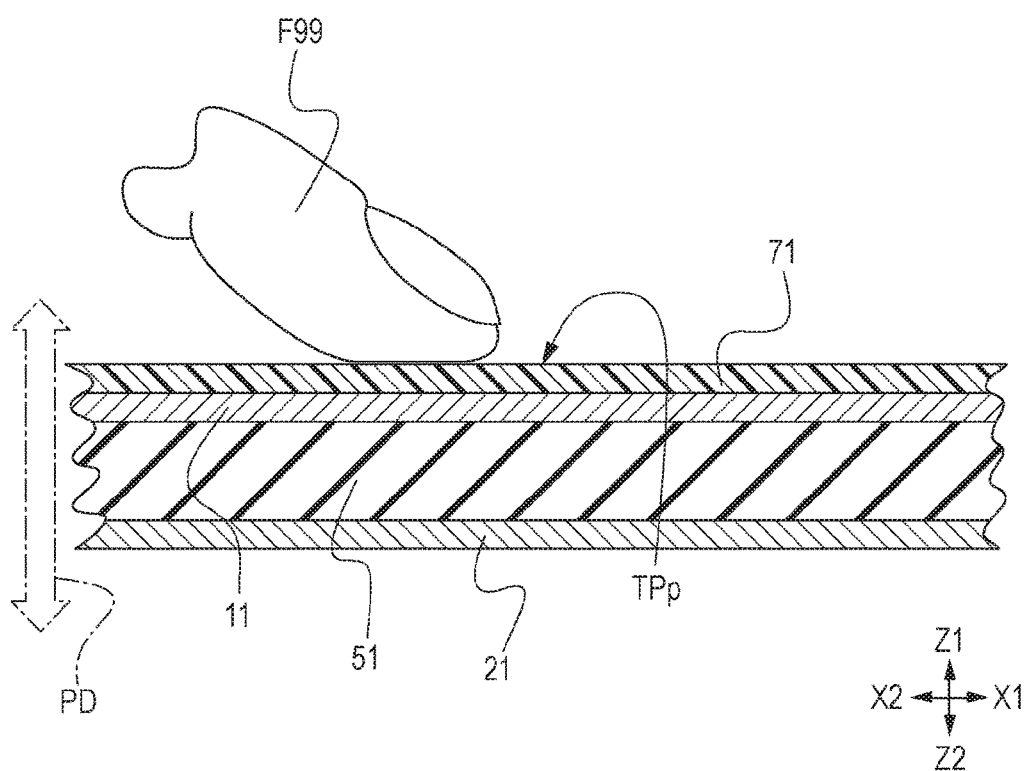
FIG. 4 is a structural diagram illustrating the input unit according to the first embodiment of the present invention, the diagram being a cross sectional view taken along line IV-IV indicated in FIG. 2B.

First, the input unit TP1 of the manipulation feeling imparting input device 101 will be described. FIGS. 2A and 2B each are a structural diagram illustrating the input unit TP1 according to the first embodiment of the present invention; FIG. 2A is a perspective view of the input unit TP1, and FIG. 2B is a top view as viewed from the Z1 side indicated in FIG. 2A. FIG. 3 is an exploded perspective view of the input unit TP1 according to the first embodiment of the present invention. FIG. 4 is a structural diagram illustrating the input unit TP1 according to the first embodiment of the present invention, the diagram being a cross sectional view taken along line IV-IV illustrated in FIG. 2B.

The input unit TP1 uses a so-called touch pad that can detect the coordinate position of the specific body region F99 (referred to be below as the fingertip), which is the user's finger tip. This input unit TP1 (touch pad) is of a detection method type called a capacitive type. When the user brings the user's fingertip close to or into contact with the manipulation surface TPp, the input unit TP1 detects the coordinate position, on the manipulation surface TPp, of the fingertip according to a change in a capacitance value, and outputs input information matching the coordinate position of the fingertip.

The input unit TP1 is connected to the vibration generating unit VB3. Specifically, the input unit TP1 is placed on a vibration transmitting member 5, which will be specifically described later, included in the vibration generating unit VB3 (see FIG. 1). When the user performs an input manipulation, vibration is imparted from the vibration generating unit VB3 to the input unit TP1.

Next, the structure of the input unit TP1 will be described in detail. As illustrated in FIGS. 2A and 2B, the input unit TP1 is shaped like a sheet as a whole. As illustrated in FIGS. 3 and 4, the input unit TP1 includes an insulating board 51 made of an epoxy resin including a glass filler, an X-coordinate detection layer 11 laminated on one surface (on the same side as the Z1 direction illustrated in FIG. 3) of the insulating board 51, a Y-coordinate detection layer 21 laminated on the other surface (on the same side as the Z2 direction illustrated in FIG. 3) of the insulating board 51, a top cover 71 that covers the X-coordinate detection layer 11, and a capacitance detecting part 91 (see FIG. 6), not illustrated in FIGS. 3 and 4, that detects capacitances in the X-coordinate detection layer 11 and Y-coordinate detection layer 21.

The insulating board 51, X-coordinate detection layer 11, and Y-coordinate detection layer 21 of the input unit TP1 are manufactured by using a so-called double-sided printed wiring board (PWB). That is, a copper foil on one surface of the double-sided PWB is patterned to form the X-coordinate detection layer 11, and a copper foil on the other surface is patterned to form the Y-coordinate detection layer 21. The X-coordinate detection layer 11 and Y-coordinate detection layer 21 cooperate with each other to detect coordinates at which a fingertip is positioned.

Although not illustrated in detail, many first electrodes in a strip shape are placed on the X-coordinate detection layer 11 of the input unit TP1. These first electrodes are equally distributed, forming a first detection electrode group. A plurality of first electrodes in the first detection electrode group are arranged and linked in one row in the Y direction. First detection electrode rows are distributed in the X direction so as to be equally spaced. Therefore, it is possible to detect the fingertip's X coordinate on the manipulation surface TPp, according to detection data indicating the row that includes a first electrode interacting with the user's fingertip.

Many second electrodes in a strip shape are placed on the Y-coordinate detection layer 21 of the input unit TP1 as with the X-coordinate detection layer 11. These second electrodes are equally distributed, forming a second detection electrode group. A plurality of second electrodes in the second detection electrode group are arranged and linked in one row in the X direction. Second detection electrode rows are distributed in the Y direction in a distributed manner so as to be equally spaced. Therefore, it is possible to detect the fingertip's Y coordinate on the manipulation surface TPp, according to detection data indicating the row that includes a second electrode interacting with the user's fingertip. Although detailed descriptions of the detection principle of the touch pad will be omitted because the principle is known, when the user brings a fingertip close to or into contact with the manipulation surface TPp, the value of a capacitance between the first electrode and the second electrode changes in the vicinity of the fingertip. Therefore, the coordinate position of the fingertip can be detected according to this change in the capacitance value.

As illustrated in FIG. 3, the top cover 71 of the input unit TP1 includes a cover sheet 71C having the manipulation surface TPp, to which the user's fingertip is brought close or with which it is brought into contact, and also includes a cover frame 71W, in an elongated frame shape, that covers the outer circumferential edge of the cover sheet 71C. The cover sheet 71C is manufactured from a polyethylene terephthalate (PET) sheet, which is a general film base material. The cover frame 71W is manufactured by injecting an acrylonitrile butadiene styrene copolymer (ABS) resin. The cover sheet 71C and cover frame 71W are bonded to each other with an adhesive such as a double-sided tape. The top cover 71 is bonded to the cover the X-coordinate detection layer 11 so as to cover it.

Figure 6:
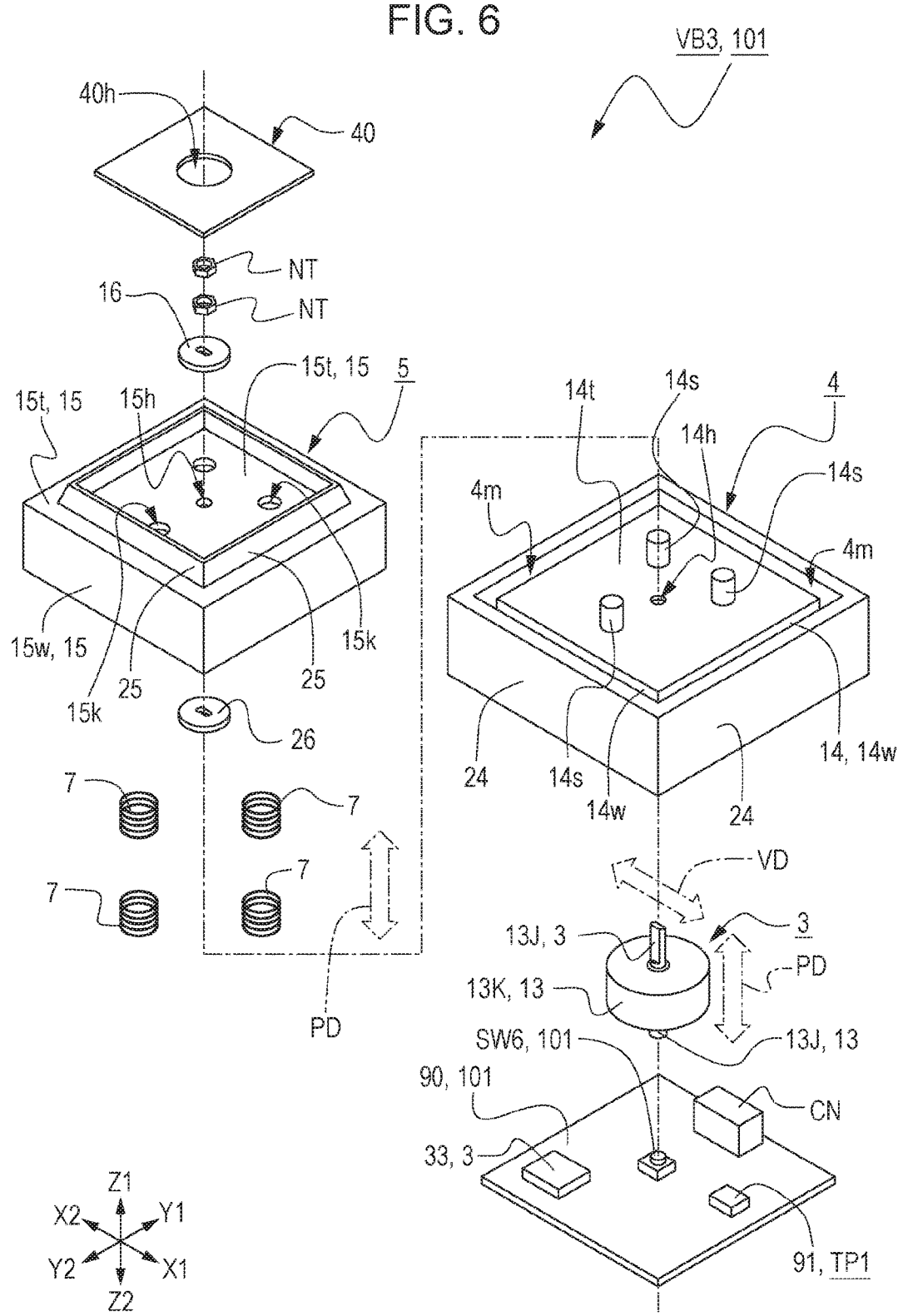
FIG. 6 is an exploded perspective view of the vibration generating unit according to the first embodiment of the present invention.

The capacitance detecting part 91 in the input unit TP1 is mounted on the wiring board 90 (see FIG. 6). The capacitance detecting part 91, which has an integrated circuit having a capacitance detection circuit, detects capacitances between the X-coordinate detection layer 11 and a finger (specific body region F99) and between the Y-coordinate detection layer 21 and the finger. The capacitance detecting part 91, which has a control unit having a control circuit in an integrated circuit, outputs detection results of the detected capacitances to an external unit. Connections between the X-coordinate detection layer 11 and the capacitance detecting part 91 and between the Y-coordinate detection layer 21 and the capacitance detecting part 91 are established with flexible printed circuits (FPC), which are not illustrated.

Next, the support member 2 in the manipulation feeling imparting input device 101 will be described. The support member 2 is a combination of various types of members that support the input unit TP1 by being pressed by the input unit TP1 so that it can perform a reciprocating operation in the PD direction. The various types of members of this support member 2 and its mechanism are incorporated into the vibration generating unit VB3, which will be described next, and are shared, so they will be clearly described in the description of the vibration generating unit VB3.

Figure 5:
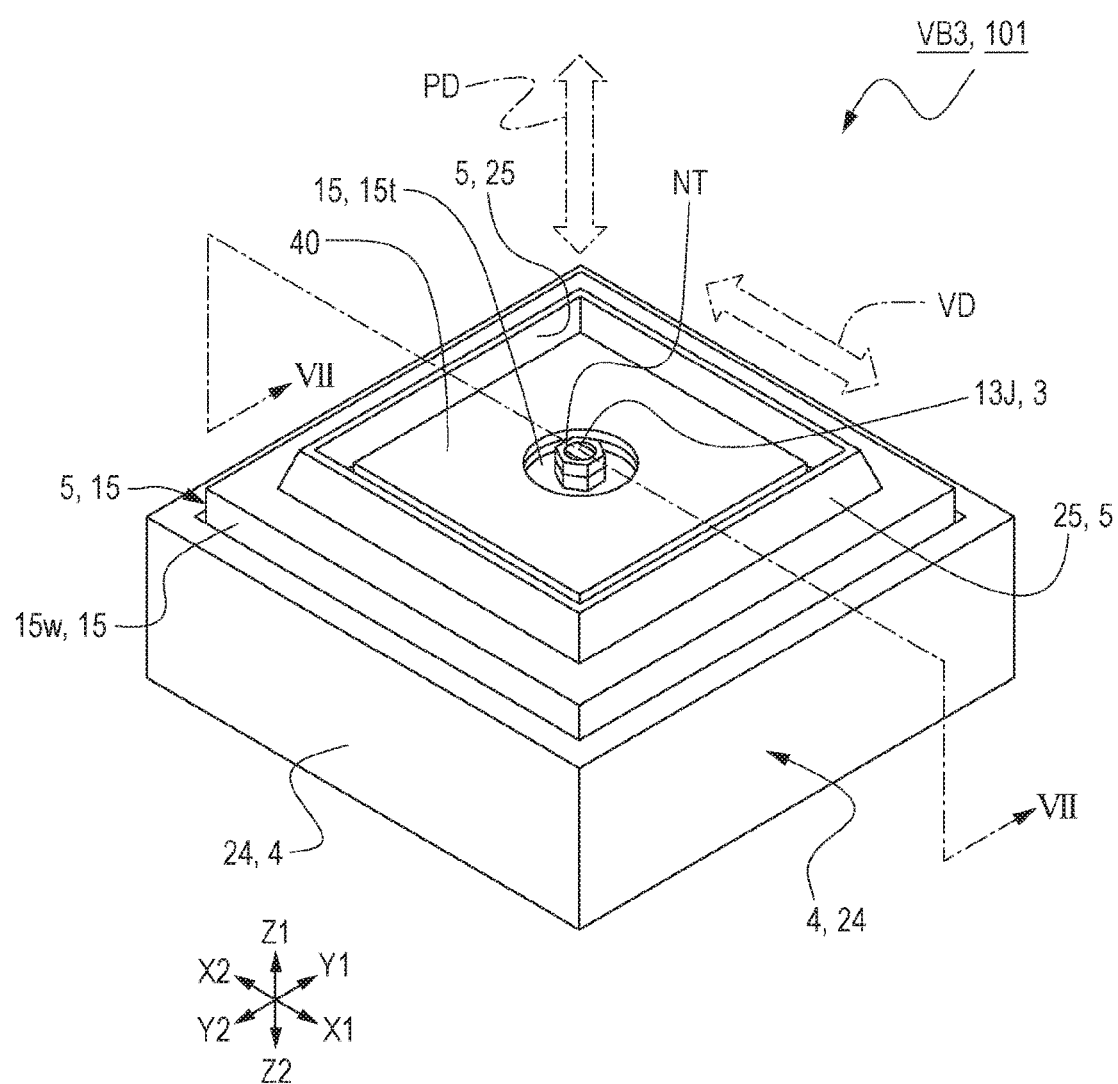
FIG. 5 is a perspective view of a vibration generating unit in the manipulation feeling imparting input device according to the first embodiment of the present invention.
Figure 7:
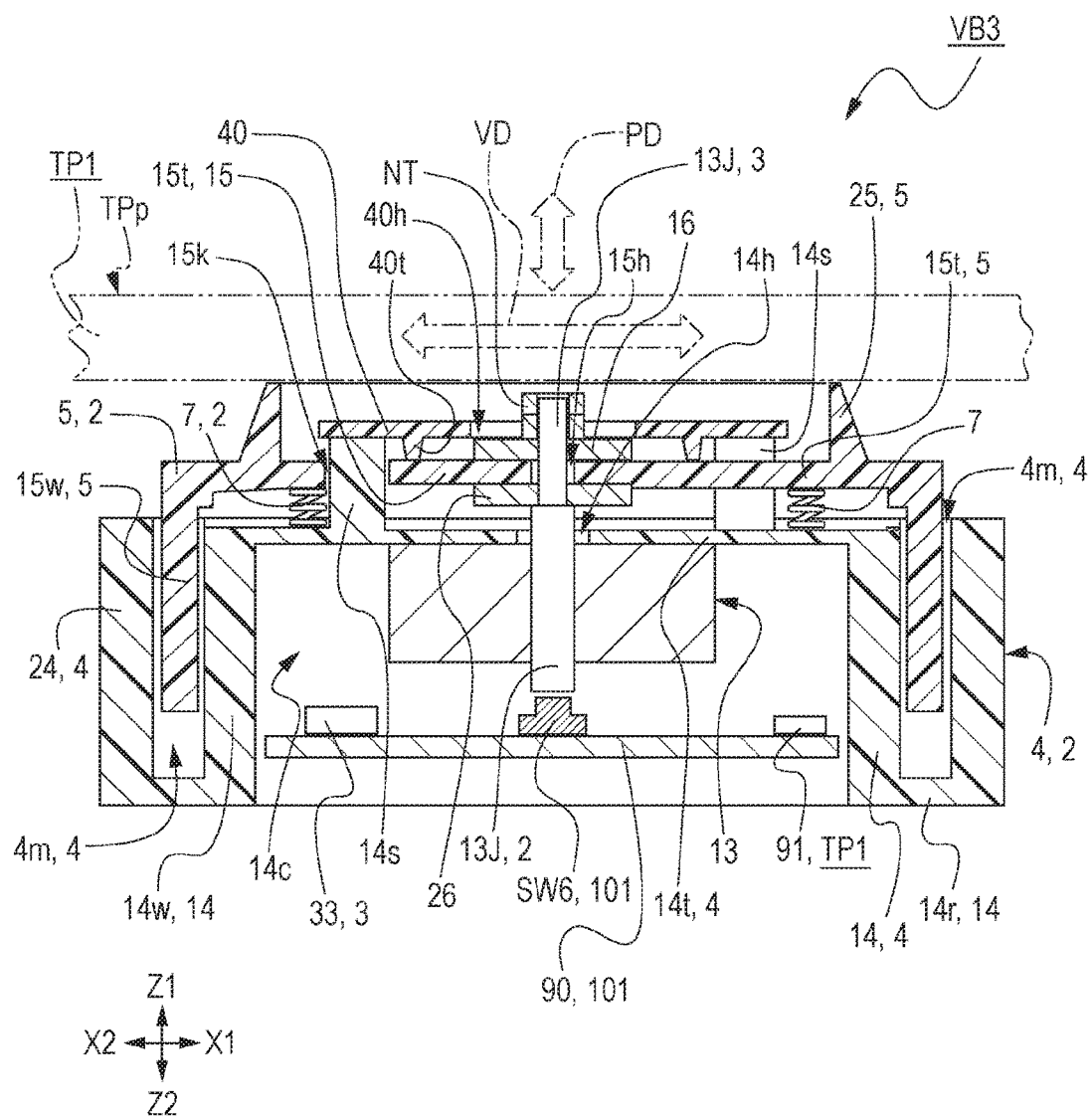
FIG. 7 illustrates the vibration generating unit according to the first embodiment of the present invention, the drawing being a longitudinal cross-sectional view taken along line VII-VII indicated in FIG. 5.

Next, the vibration generating unit VB3 in the manipulation feeling imparting input device 101 will be described. FIG. 5 is a perspective view of the vibration generating unit VB3 in the manipulation feeling imparting input device 101 according to the first embodiment of the present invention. FIG. 6 is an exploded perspective view of the vibration generating unit VB3. FIG. 7 is a longitudinal cross-sectional view of the vibration generating unit VB3 as taken along line VII-VII illustrated in FIG. 5. In FIG. 7, the cross-section of a vibrating body 13 in a vibration generating member 3 is simplified. The cross-section of the vibrating body 13 will be illustrated in detail in FIGS. 8A and 8B, which will be referenced later.

The vibration generating unit VB3 has a box-like outside shape as illustrated in FIG. 5. As illustrated in FIGS. 6 and 7, the vibration generating unit VB3 includes the vibration generating member 3 that has a movable part 13J operable in a vibration direction VD (X direction indicated in FIG. 5), a base body 4 that holds the vibration generating member 3, and the vibration transmitting member 5 connected to the movable part 13J. In addition, in the first embodiment of the present invention, the vibration generating unit VB3 has urging members 7 (see FIG. 7) that urge the vibration generating member 3 and vibration transmitting member 5 in directions away from each other, and also has a top plate member 40 fixed to the base body 4, as illustrated in FIG. 6. With the input unit TP1 placed on (connected to) the vibration transmitting member 5, the vibration generating unit VB3 can drive the vibration generating member 3 in response to a touch manipulation performed on the input unit TP1 by the user, and can transmit (impart) vibration to the user. Thus, even if a device cannot easily provide a manipulation sense, the vibration generating unit VB3 can give a manipulation sense, that is, a vibration feedback feeling, to the user.

Figure 8A:
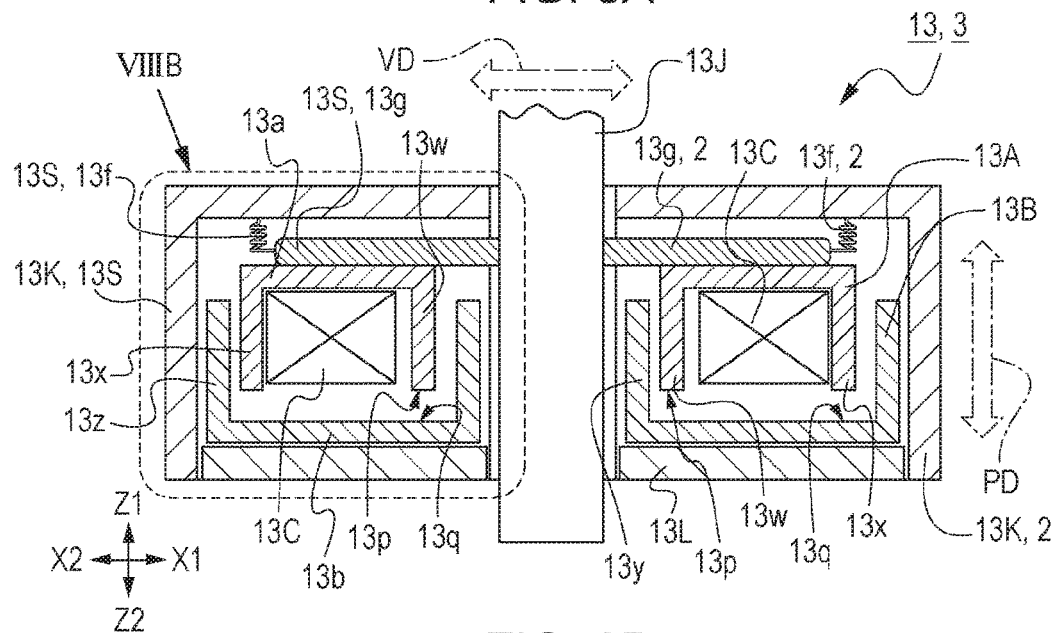
FIGS. 8A and 8B schematically illustrate a vibration generating member included in the vibration generating unit according to the first embodiment of the present invention, FIG. 8A being a longitudinal cross-sectional view of a vibrating body included in the vibration generating member illustrated in FIG. 7, FIG. 8B being an enlarged view of a portion VIIIB indicated in FIG. 8A.
Figure 8B:
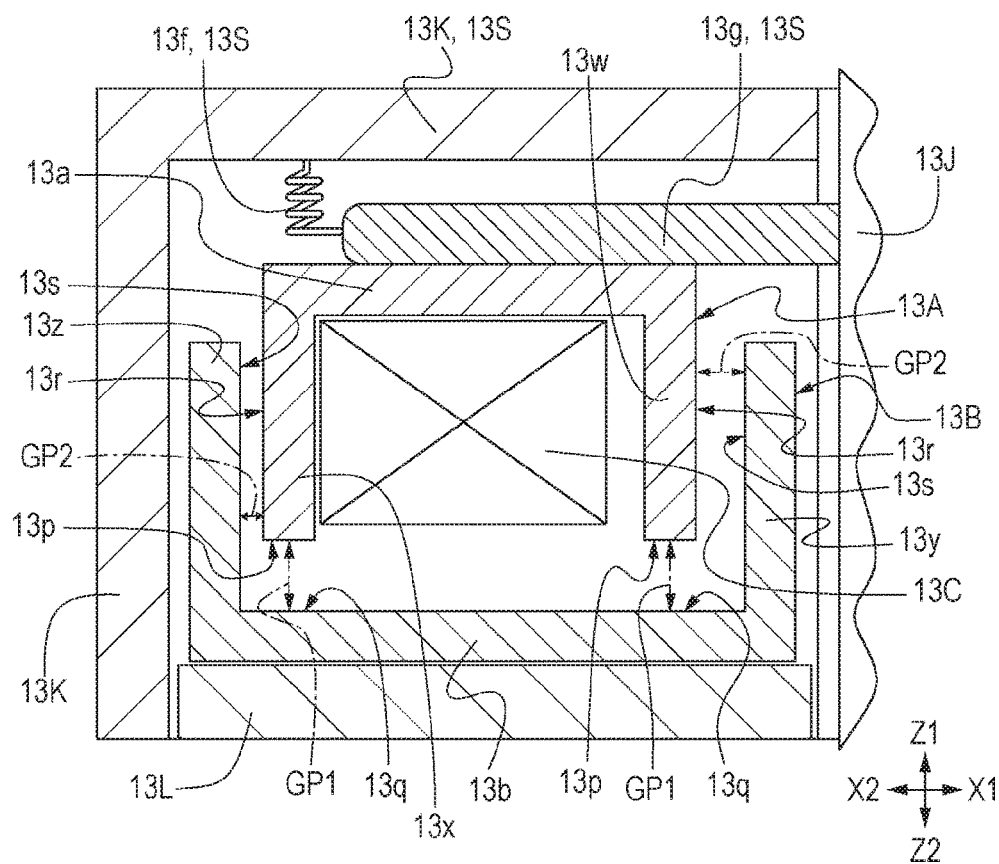
Figure 9A:
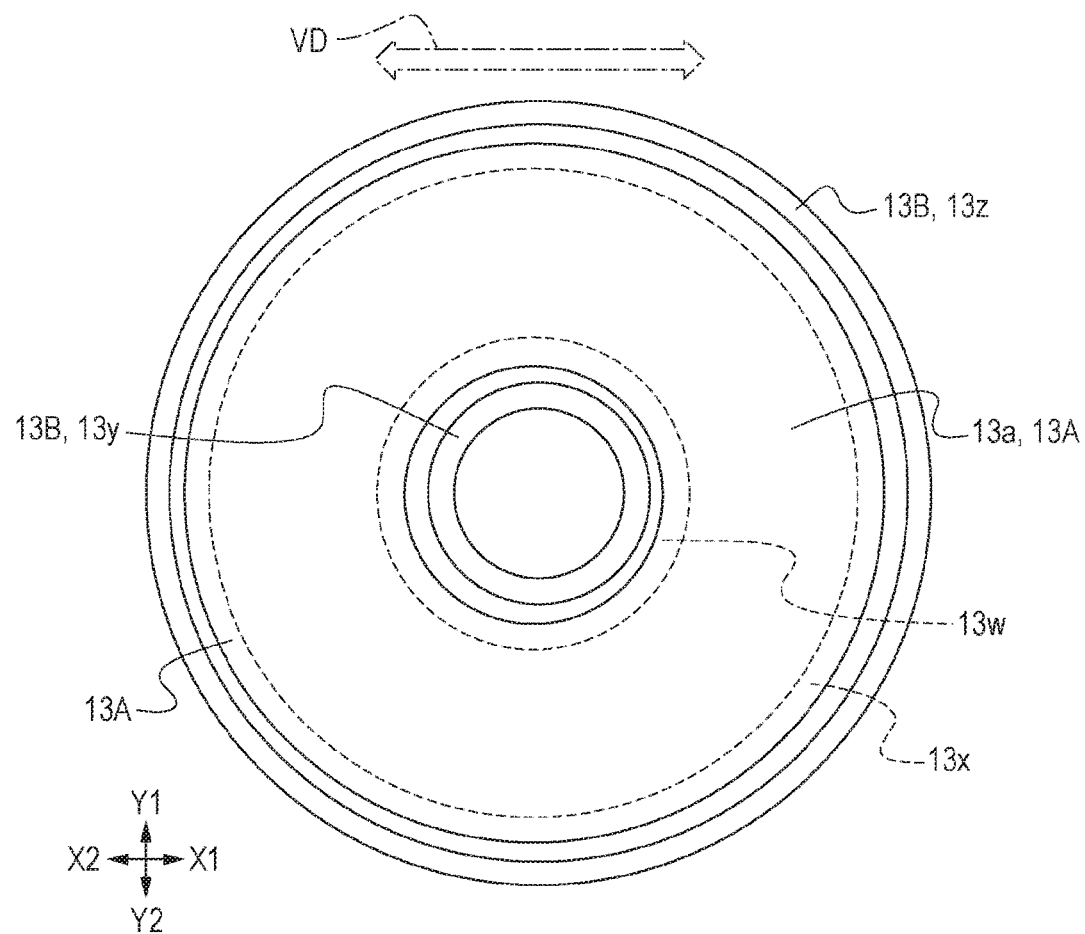
FIGS. 9A and 9B schematically illustrate the vibration generating member in the vibration generating unit according to the first embodiment of the present invention, FIG. 9A being a top view illustrating a first yoke and a second yoke in the vibrating body in the vibration generating member, FIG. 9B being a side view of the first yoke and second yoke as viewed from the Y2 side indicated in FIG. 9A.
Figure 9B:
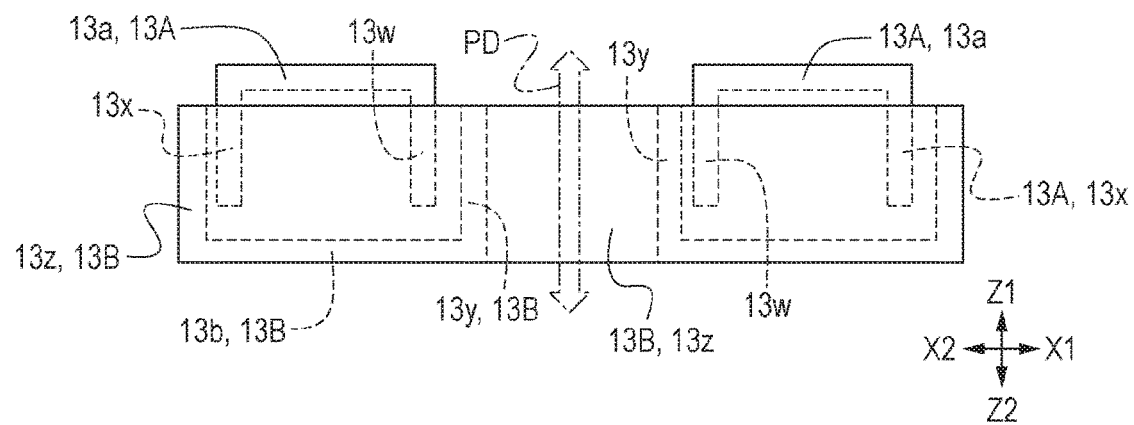
Figure 10A:
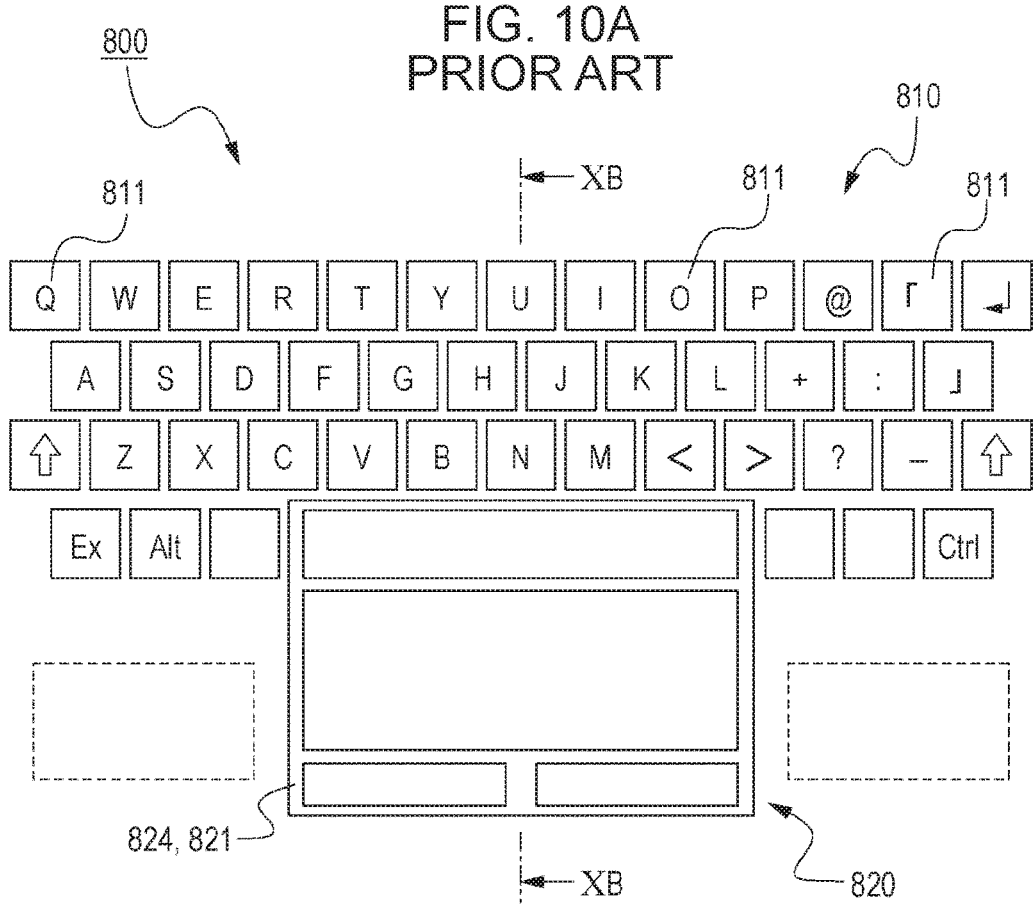
FIGS. 10A and 10B illustrate an input device in a first conventional example, the input unit being used in a personal computer, FIG. 10A being a plan view of the input device, FIG. 10B being a cross-sectional view taken along line XB-XB indicated in FIG. 10A.
Figure 10B:
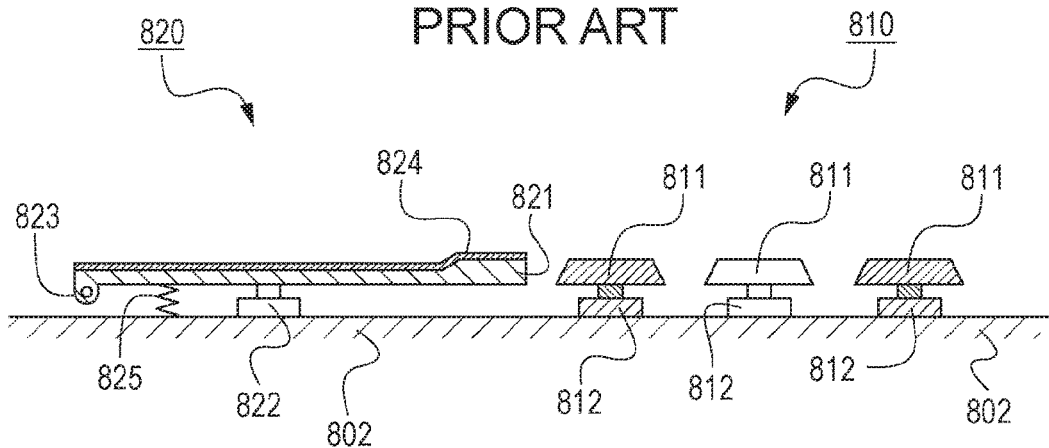

First, the vibration generating member 3 in the vibration generating unit VB3 will be described. FIGS. 8A and 8B schematically illustrate the vibration generating member 3; FIG. 8A is a cross-sectional view of the vibrating body 13 illustrated in FIG. 7, and FIG. 8B is an enlarged view of a portion VIIIB indicated in FIG. 8A. FIGS. 9A and 9B schematically illustrate the vibrating body 13 in the vibration generating member 3; FIG. 9A is a top view illustrating a first yoke 13A and a second yoke 13B in the vibrating body 13, and FIG. 9B is a side view of the first yoke 13A and second yoke 13B as viewed from the Y2 side indicated in FIG. 9A.

As illustrated in FIG. 6, the vibration generating member 3 includes the vibrating body 13 that has the movable part 13J operable in the vibration direction VD, a control unit 33 that controls the vibrating body 13, and flexible printed circuits (FPC) (not illustrated) that electrically connect the vibrating body 13 and control unit 33 together.

As illustrated in FIGS. 8A and 8B, the vibrating body 13 in the vibration generating member 3 preferably includes the movable part 13J operable in the vibration direction VD (X direction illustrated in FIG. 5), the first yoke 13A and second yoke 13B, which are placed so as to be spaced in the pressing direction PD, a coil 13C placed in the vicinity of the first yoke 13A, and support bodies 13S (in FIGS. 8A and 8B, spring members 13f and support plates 13g) that support the first yoke 13A so as to be movable in the vibration direction VD. Besides, in the first embodiment of the present invention, the vibrating body 13 has a main body case 13K, which is in a cylindrical shape, accommodates the first yoke 13A, second yoke 13B, coil 13C, and the like as illustrated in FIG. 6, and also has a main body cover 13L that covers the lower side (on the same side as the Z2 direction indicated in FIGS. 8A and 8B) of the main body case 13K as illustrated in FIG. 8A. When a current is supplied to the coil 13C, magnetic paths are formed in the first yoke 13A and second yoke 13B and a magnetic attractive force is generated between the first yoke 13A and the second yoke 13B.

The movable part 13J of the vibrating body 13, which is manufactured from a metal material such as iron, is placed so as to pass through the central portion of the main body case 13K as illustrated in FIG. 6. The movable part 13J moves so as to be able to reciprocate along the vibration direction VD in response to a driving signal applied to the vibrating body 13. The movable part 13J can reciprocate in the pressing direction PD crossing the vibration direction VD in response to a pressing manipulation by the user as well.

As illustrated in FIG. 7, the upper side (Z1 side indicated in FIG. 7) of the movable part 13J is fixed to the top surface 15t of the vibration transmitting member 5 by a first holding plate 16 and a second holding plate 26, which will be described later, connecting the movable part 13J to the vibration transmitting member 5. Thus, the operation of the movable part 13J in the vibration direction VD is transmitted to the vibration transmitting member 5. Along with the reciprocating operation of the movable part 13J in the pressing direction PD, the vibration transmitting member 5 reciprocates in the pressing direction PD. Here, the movable part 13J and vibration transmitting member 5 function as the support member 2 that supports the input unit TP1 so as to be able to reciprocate in the PD direction.

The first yoke 13A of the vibrating body 13 is manufactured from a soft magnetic material such as iron. As illustrated in FIG. 9A, the first yoke 13A has a flat plate part 13a in a ring shape, its outside shape being preferably circular in a plan view, its central portion being a circular opening. As illustrated in FIGS. 8A and 8B, the first yoke 13A has an inner wall part 13w extending perpendicularly from the inner end of the flat plate part 13a (in FIGS. 8A and 8B, the inner wall part 13w extends in the Z1 direction), and also has an outer wall part 13x extending perpendicularly from the outer end of the flat plate part 13a. As illustrated in FIGS. 8A and 8B, the first yoke 13A has a U-shaped cross section formed by the flat plate part 13a, inner wall part 13w, and outer wall part 13x.

As illustrated in FIGS. 8A and 8B, the first yoke 13A is fixed to the support plate 13g of the support body 13S. This support plate 13g is supported to the main body case 13K by the spring member 13f of the support body 13S so as to be movable. Thus, the movement of the first yoke 13A in the vibration direction VD becomes possible and its movement in the pressing direction PD also becomes possible.

Although not illustrated in detail, the support plate 13g is engaged with the movable part 13J, so the movement of the first yoke 13A in the vibration direction VD and in the pressing direction PD is transmitted through the support plate 13g to the movable part 13J. Although, in the first embodiment of the present invention, specific parts used as the support body 13S that supports the first yoke 13A so as to be movable in the vibration direction VD are omitted, these parts include the spring members 13f, support plates 13g, and main body case 13K. The support body 13S also functions as the support member 2 that supports the input unit TP1 so as to be able to reciprocate in the pressing direction PD.

The second yoke 13B of the vibrating body 13 is manufactured from a soft magnetic material such as iron, as with the first yoke 13A. As illustrated in FIGS. 8A and 8B, the second yoke 13B has a flat plate part 13b in a ring shape, its outside shape being preferably circular in a plan view, its central portion being a circular opening. As illustrated in FIGS. 8A and 8B, the second yoke 13B has an inner wall part 13y extending perpendicularly from the inner end of the flat plate part 13b (in FIGS. 8A and 8B, the inner wall part 13y extends in the Z1 direction), and also has an outer wall part 13z extending perpendicularly from the outer end of the flat plate part 13b. As illustrated in FIGS. 8A and 8B, the second yoke 13B similarly has a U-shaped cross section formed by the flat plate part 13b, inner wall part 13y, and outer wall part 13z. As illustrated in FIGS. 8A and 8B, the second yoke 13B is fixed to the main body cover 13L.

With the vibrating body 13 assembled, the first yoke 13A and second yoke 13B are preferably spaced so as to face each other in the pressing direction PD, making the flat plate part 13a of the first yoke 13A and the flat plate part 13b of the second yoke 13B face each other, as illustrated in FIGS. 8A, 8B, and 9B. The first yoke 13A and second yoke 13B are formed so that the size of the outside shape of the second yoke 13B is larger than the size of the outside shape of the first yoke 13A. Thus, the inner wall part 13w and outer wall part 13x of the first yoke 13A are accommodated in the U-shaped concave part of the second yoke 13B. Thus, the inner wall part 13w of the first yoke 13A and the inner wall part 13y of the second yoke 13B face each other, and the outer wall part 13x of the first yoke 13A and the outer wall part 13z of the second yoke 13B also face each other. In this case, as illustrated in FIG. 9A, the first yoke 13A and second yoke 13B are placed so that a slight deviation (offset) is made to have a mismatch between the central positions of the first yoke 13A and second yoke 13B and to have the first yoke 13A come close to the second yoke 13B on the same side as the X2 direction. Thus, when a current is supplied to the coil 13C, the magnetic attractive force in the X2 direction becomes stronger.

As described above, the outside shapes of the first yoke 13A and second yoke 13B are circular in a plan view. Therefore, even if their mutual positional relationship is slightly deviated from a desired positional relationship due to tolerances in part manufacturing and the like, deviation in a particular direction is lessened, so vibration with less eccentricity can be obtained.

After the first yoke 13A and second yoke 13B with a structured as described above has been assembled, the inner wall part 13w and outer wall part 13x of the first yoke 13A each have a first pressing-side opposite surface 13p, which faces the flat plate part 13b of the second yoke 13B in the pressing direction PD, and the flat plate part 13b of the second yoke 13B has a second pressing-side opposite surface 13q, which faces the first pressing-side opposite surface 13p.

In an orthogonal direction orthogonal to the pressing direction PD, that is, in the vibration direction VD in the first embodiment of the present invention, the inner wall part 13w of the first yoke 13A has a first orthogonal-side opposite surface 13r, which faces the inner wall part 13y of the second yoke 13B in the orthogonal direction (vibration direction VD), and the outer wall part 13x of the first yoke 13A has another first orthogonal-side opposite surface 13r, which faces the outer wall part 13z of the second yoke 13B in the orthogonal direction (vibration direction VD). In addition, the inner wall part 13y and outer wall part 13z of the second yoke 13B each have a second orthogonal-side opposite surface 13s, which faces the relevant first orthogonal-side opposite surface 13r.

In addition, as illustrated in FIG. 8B, a first gap GP1 is preferably generated between the first pressing-side opposite surface 13p of the first yoke 13A and the second pressing-side opposite surface 13q of the second yoke 13B, and a second gap GP2 is preferably generated between the first orthogonal-side opposite surface 13r of the first yoke 13A and the second orthogonal-side opposite surface 13s of the second yoke 13B. This second gap GP2 is preferably formed so as to be narrower than the first gap GP1. Thus, when a current is supplied to the coil 13C, the magnetic attractive force between the first yoke 13A and second yoke 13B in the second gap GP2 becomes strong. Therefore, the first yoke 13A moves faster toward the second yoke 13B in the orthogonal direction in the second gap GP2, so the first yoke 13A vibrates in the orthogonal direction. In this case, since the first yoke 13A is placed so as to come close to the second yoke 13B on the same side as the X2 direction illustrated in FIG. 9A, the first yoke 13A vibrates in the X direction.

Furthermore, in an initial state in which no magnetic attractive force is generated, the opposite areas of the first orthogonal-side opposite surface 13r and second orthogonal-side opposite surface 13s in the orthogonal direction are preferably larger than the opposite areas of the first pressing-side opposite surface 13p and second pressing-side opposite surface 13q in the pressing direction PD. Thus, when a current is supplied to the coil 13C, the magnetic attractive force between the first yoke 13A and the second yoke 13B in the orthogonal direction (in the second gap GP2) becomes stronger, so the first yoke 13A vibrates more strongly in the orthogonal direction.

In the first embodiment of the present invention, the first pressing-side opposite surface 13p and second pressing-side opposite surface 13q are formed so as to have such areas that any one of the first pressing-side opposite surface 13p and second pressing-side opposite surface 13q covers the other in a range within which the first yoke 13A moves. Therefore, even when the first yoke 13A moves in the orthogonal direction when a magnetic attractive force is generated, the first pressing-side opposite surface 13p and second pressing-side opposite surface 13q surely overlap.

Thus, since the opposite areas of the first pressing-side opposite surface 13p and second pressing-side opposite surface 13q are preferably the same as in the initial state in which no magnetic attractive force is generated, the area of a portion that has an effect of mainly inducing a magnetic flux remains unchanged and is not thereby reduced. Therefore, the magnetic resistance of this portion is not lowered, so the magnetic attractive force between the first yoke 13A and second yoke 13B in the second gap GP2 is stabilized.

In the first embodiment of the present invention, a plurality of second gap GP2 are preferably provided in the orthogonal direction; specifically, four second gaps GP2 are provided on both sides, two on each side. Therefore, the magnetic attractive force between the first yoke 13A and the second yoke 13B in the orthogonal direction can be made stronger. Thus, it is possible to cause the first yoke 13A to vibrate even more strongly in the vibration direction VD, which is the orthogonal direction.

The control unit 33, which uses an integrated circuit (IC), in the vibration generating member 3 is mounted on the wiring board 90 as illustrated in FIG. 6. The control unit 33 transmits a driving signal to the vibrating body 13 in response to a command signal matching the input manipulation performed on the input unit TP1 connected to the vibration generating unit VB3.

The flexible printed circuits (FPC) in the vibration generating member 3 uses a film base material, based on a polyimide (PI) resin, which is generally in widespread use. One end of the FPC is connected to the vibrating body 13, and the other end is connected to the control unit 33 through a connector CN illustrated in FIG. 6.

Next, the base body 4 in the vibration generating unit VB3 will be described. The base body 4 is manufactured by injecting a synthetic resin such as an ABS resin. As illustrated in FIG. 6, the base body 4 includes a base part 14 in a box shape, the base part 14 being open on the lower side (on the same side as the Z2 direction indicated in FIG. 6) (see FIG. 7), and also includes outer circumferential wall parts 24, which are connected to the base part 14 on the lower side (see FIG. 7) and enclose the outer circumference of the base part 14.

The base part 14 in the base body 4 includes an upper wall part 14t in a substantially square shape, side wall parts 14w extending downward from the four edges of the upper wall part 14t, and linkage parts 14r (see FIG. 7) that link the base part 14 and outer circumferential wall parts 24 together. The side wall parts 14w of the base part 14 and the outer circumferential wall parts 24 form groove parts 4m.

The upper wall part 14t of the base part 14 has a circular through-hole 14h at the central portion and also includes three protrusions 14s extending upward from the upper wall part 14t. With the vibration generating unit VB3 assembled, the movable part 13J of the vibration generating member 3 is inserted into this circular through-hole 14h and, although not illustrated in detail, the main body case 13K of the vibrating body 13 is accommodated in an accommodating part 14c inside the base part 14, as illustrated in FIG. 7. The main body case 13K of the vibrating body 13 is fixed to the inside of the upper wall part 14t with screws or the like, holding the vibration generating member 3 to the base body 4. The urging members 7 are placed on the upper wall part 14t.

Next, the top plate member 40 in the vibration generating unit VB3 will be described. The top plate member 40 is manufactured in a rectangular plate shape by injecting a synthetic resin such as an ABS resin. The top plate member 40 has a circular through-hole 40h at the central portion as illustrated in FIG. 6, and also has restricting parts 40t protruding downward from the lower surface at positions at which they enclose the through-hole 40h as illustrated in FIG. 7. The lower surface of the top plate member 40 and the protrusions 14s of the base body 4 are bonded or welded together, integrally fixing the top plate member 40 to the base body 4.

Next, the vibration transmitting member 5 in the vibration generating unit VB3 will be described. The vibration transmitting member 5 is manufactured by injecting a synthetic resin such as an ABS resin. As illustrated in FIG. 6, the vibration transmitting member 5 includes a base part 15 in a box shape, which is open on the lower side (see FIG. 7), and a placement part 25, which is formed along the outer circumference of the upper surface side of the base part 15 so as to protrude upward.

As illustrated in FIG. 6, the base part 15 in the vibration transmitting member 5 includes a top surface 151 in a substantially square shape and side walls 15w extending downward from the four edges of the top surface 151. With the vibration generating unit VB3 assembled, as illustrated in FIG. 7, the side walls 15w of the base part 15 are inserted into the groove parts 4m in the base body 4 and the vibration transmitting member 5 is disposed with space left around it, the spacing being enough for the vibration transmitting member 5 to movable in the pressing direction PD and vibration direction VD.

As illustrated in FIG. 6, the top surface 151 of the base part 15 has a first hole part 15h, which is circular, at the central portion and also has three second hole parts 15k at positions corresponding to the protrusions 14s of the base body 4. With the vibration generating unit VB3 assembled, as illustrated in FIG. 7, the movable part 13J in the vibration generating member 3 is inserted into the first hole part 15h and the protrusions 14s of the base part 14 in the base body 4 are inserted into the second hole parts 15k.

As described above, the top surface 151 is sandwiched by the first holding plate 16 and second holding plate 26 and is tightened with a nut NT. Therefore, the vibration transmitting member 5 and movable part 13J are connected together and are fixed. Thus, the operation of the movable part 13J in the vibration direction VD is transmitted to the vibration transmitting member 5.

As illustrated in FIG. 6, the placement part 25 in the vibration transmitting member 5 extends upward from the upper surface side of the base part 15 and is formed in a frame shape along the outer circumference of the base part 15. Although not illustrated in detail, the input unit TP1 is placed on this placement part 25 and is fixed to it as illustrated in FIG. 1. In this case, since the input unit TP1 is connected preferably integrally to the placement part 25, vibration generated by the vibration generating unit VB3 is efficiently transmitted directly to the input unit TP1. Therefore, even when the volumes of the first yoke 13A and second yoke 13B are reduced or the coil 13C is downsized, vibration generated by the vibration generating unit VB3 is efficiently transmitted to the input unit TP1, so it is possible to downsize the vibration generating unit VB3 without a manipulation feeling being impaired.

As illustrated in FIG. 1, the pressing direction PD, in which the flat-type input unit TP1 reciprocates by being pressed, and the vibration direction VD, in which vibration is imparted to the input unit TP1 by the vibration generating unit VB3, cross each other (in this embodiment, these directions are orthogonal to each other). Therefore, when the input unit TP1 is manipulated and the resulting vibration is imparted to the input unit TP1, air resistance to the input unit TP1 due to the vibration is received by the side surfaces of the input unit TP1. Thus, since the input unit TP1 does not receive the air resistance on the entire flat surface, a vibration sound can be suppressed when compared with the vibration generating device in the conventional example (electromagnetic actuator 900) that vibrates in the vertical direction. Therefore, it is possible to provide the manipulation feeling imparting input device 101 configured so that a vibration sound is suppressed in the flat-type input unit TP1 to which a manipulation feeling caused by vibration is imparted.

Next, the urging member 7 in the vibration generating unit VB3 will be described. As illustrated in FIG. 6, the urging members 7 use four general coil springs. As illustrated in FIG. 7, the urging members 7 are placed between the upper wall part 14t of the base body 4 and the top surface 151 of the vibration transmitting member 5, and urge the vibration generating member 3 and vibration transmitting member 5 in directions away from each other.

Since a coil spring is used as the urging member 7, the urging member 7 can be deformed in the vibration direction VD (X direction indicated in FIG. 6) and can also be deformed in the pressing direction PD (Z direction indicated in FIG. 6). This allows the vibration transmitting member 5 to move in the vibration direction VD and pressing direction PD. The urging member 7 and base body 4 function as the support member 2 that supports the input unit TP1 so as to be able to reciprocate in the pressing direction PD. The urging member 7 is not limited to a coil spring; for example, magnets may be used. In this case, when a plurality of magnets are placed in the Z direction at the positions at which the urging members 7 are present in FIG. 7 so that identical poles face each other with space interposed, the repulsive forces of the magnets make it possible to support the input unit TP1 so as to be able to reciprocate in the pressing direction PD.

Next, the switch member SW6 in the manipulation feeling imparting input device 101 will be described. As the switch member SW6, a generally-used push switch is used. As illustrated in FIG. 7, the switch member SW6 is mounted on the wiring board 90 so as to face the surface of the lower end of the movable part 13J (Z2 side indicated in FIG. 7). Upon the receipt of a pressing manipulation performed on the input unit TP1 by the user in the pressing direction PD, the movable part 13J reciprocates, turning on and off the push switch.

Finally, the wiring board 90 in the manipulation feeling imparting input device 101 will be described. As the wiring board 90, a generally-used double-sided PWB is used. As illustrated in FIG. 7, the wiring board 90 is accommodated in the accommodating part 14c inside the base part 14. Although not illustrated in detail, the wiring board 90 is fixed to the base body 4 with screws or the like. As illustrated in FIG. 6, the control unit 33 in the vibration generating member 3, the capacitance detecting part 91 in the input unit TP1, the connector CN, the switch member SW6, and the like are mounted on the wiring board 90.

Effects of the manipulation feeling imparting input device 101, structured as described above, in the first embodiment of the present invention will be compiled below.

With the manipulation feeling imparting input device 101 in the first embodiment of the present invention, the pressing direction PD, in which the flat-type input unit TP1 reciprocates by being pressed, and the vibration direction VD, in which vibration is imparted to the input unit TP1 by the vibration generating unit VB3, cross each other. Therefore, when the input unit TP1 is manipulated and the resulting vibration is imparted to the input unit TP1, air resistance to the input unit TP1 due to the vibration is received by the side surfaces of the input unit TP1. Thus, since the input unit TP1 does not receive the air resistance on the entire flat surface, a vibration sound can be suppressed when compared with the vibration generating device in the conventional example (electromagnetic actuator 900) that vibrates in the vertical direction. Therefore, it is possible to provide the manipulation feeling imparting input device 101 configured so that a vibration sound is suppressed in the flat-type input unit TP1 to which a manipulation feeling caused by vibration is imparted.

Since the second gap GP2 formed in the orthogonal direction (direction orthogonal to the pressing direction PD) between the first yoke 13A and second yoke 13B in the vibration generating member 3 is narrower than the first gap GP1 formed in the pressing direction PD between the first yoke 13A and the second yoke 13B, when a current is supplied to the coil 13C, the magnetic attractive force between the first yoke 13A and second yoke 13B in the second gap GP2 becomes strong. Thus, the first yoke 13A moves faster toward the second yoke 13B in the orthogonal direction in the second gap GP2, so the first yoke 13A vibrates in the orthogonal direction. Therefore, it is possible for the vibration transmitting member 5 to reliably give vibration in the vibration direction VD, which is the orthogonal direction, to the input unit TP1 through the movable part 13J, which is operable in the vibration direction VD.

Since a plurality of second gaps GP2 are provided in the orthogonal direction, the magnetic attractive force between the first yoke 13A and the second yoke 13B in the orthogonal direction can be made stronger. Thus, it is possible to give stronger vibration in the vibration direction VD, which is the orthogonal direction, to the input unit TP1.

Since the opposite areas of the first orthogonal-side opposite surface 13r and second orthogonal-side opposite surface 13s in the orthogonal direction are larger than the opposite areas of the first pressing-side opposite surface 13p and second pressing-side opposite surface 13q in the pressing direction PD, when a current is supplied to the coil 13C, the magnetic attractive force between the first yoke 13A and the second yoke 13B in the orthogonal direction (in the second gap GP2) becomes stronger. Thus, the first yoke 13A moves even faster toward the second yoke 13B in the orthogonal direction, so the first yoke 13A vibrates more strongly in the orthogonal direction. Therefore, it is possible for the vibration transmitting member 5 to give even stronger vibration in the vibration direction VD, which is the orthogonal direction, to the input unit TP1 through the movable part 13J, which is operable in the vibration direction VD (orthogonal direction).

Even when the first yoke 13A moves in the orthogonal direction at a time when a magnetic attractive force is generated, since the opposite areas of the first pressing-side opposite surface 13p and second pressing-side opposite surface 13q are the same as in the initial state in which no magnetic attractive force is generated, the area of a portion that has an effect of mainly inducing a magnetic flux remains unchanged and is not thereby reduced. Therefore, the magnetic resistance of this portion is not lowered, so the magnetic attractive force between the first yoke 13A and second yoke 13B in the second gap GP2 is stabilized.

When the first yoke 13A and second yoke 13B are assembled so that they face each other, their mutual positional relationship may be slightly deviated from a desired positional relationship due to tolerances in part manufacturing and the like. Even in this case, since the outside shapes of the first yoke 13A and second yoke 13B are circular in a plan view, deviation in a particular direction is lessened, so vibration with less eccentricity can be obtained.

Since the input unit TP1 is connected integrally to the vibration transmitting member 5, vibration generated by the vibration generating unit VB3 is efficiently transmitted directly to the input unit TP1. Thus, an even stronger manipulation feeling is imparted to the input unit TP1.

The present invention is not limited to the embodiment described above. The present invention can also be practiced by, for example, making variations as described below. These variations are also included in the technical range of the present invention.

First Variation

Although, in the first embodiment described above, a capacitive touch pad has been preferably used as the input unit TP1, this is not a limitation. For example, a so-called touch panel that uses a translucent base material and translucent electrodes may be used. For example, a panel of a type that uses conductive-filler-bearing conductive patterns may be used as electrodes.

Second Variation

Although, in the first embodiment described above, the spring member 13f has been used as the support body 13S that supports the first yoke 13A so as to be movable in the vibration direction VD, the spring member 13f may not be used. In this case, the urging member 7 that allows the movement of the movable part 13J in the vibration direction VD and pressing direction PD through the vibration transmitting member 5 undertakes a function as a support body that supports the movement of the first yoke 13A engaged with the movable part 13J in the vibration direction VD.

Third Variation

Although, in the first embodiment described above, the first yoke 13A has been placed close to the second yoke 13B on the same side as the X2 direction and has vibrated in the X direction (vibration direction VD), this is not a limitation. By designing the placement positions of the first yoke 13A and second yoke 13B and their shapes, it is possible to cause vibration in an arbitrary orthogonal direction orthogonal to the pressing direction PD, that is, in an arbitrary direction on an X-Y plane orthogonal to the Z direction (pressing direction PD).

Fourth Variation

Although, in the first embodiment described above, the coil 13C has been placed in the vicinity of the first yoke 13A, this is not a limitation. It suffices to place the coil 13C in the vicinity of at least one of the first yoke 13A and second yoke 13B.

Fifth Variation

Although, in the first embodiment described above, the outside shapes of the first yoke 13A and second yoke 13B have been preferably circular in a plan view, this is not a limitation. For example, the outside shapes may be rectangular in a plan view. For example, the first yoke 13A and second yoke 13B may be provided independently of each other in the vibration direction VD.

Sixth Variation

Although, in the first embodiment described above, the X-coordinate detection layer 11, Y-coordinate detection layer 21, and insulating board 51 have been preferably manufactured by using a double-sided PWB, this is not a limitation. They may be manufactured by, for example, printing a conductive paste on both surfaces of a film base material and curing the paste. Alternatively, they may be manufactured by, for example, creating a transparent conductive film (such as, for example, a tin-doped indium oxide (ITO) film) on both surfaces of a glass base material.

Seventh Variation

Although, in the first embodiment described above, the switch member SW6 has been used as a member that detects a pressing manipulation performed on the input unit TP1, this is not a limitation. For example, a sensor member such as a pressure sensor or force sensor may be placed at a position at which the sensor faces the top of the movable part 13J.

The present invention is not limited to the embodiment described above. The present invention can be appropriately modified without departing from the intended scope of the present invention.

What is claimed is:

1. An input device providing manipulation feeling, the input device comprising:
   a flat-type input unit having a manipulation surface manipulated by an operation body, the input unit being configured to output input information made by a manipulation performed on the manipulation surface;
   a support member that movably supports the input unit such that the input unit reciprocates in a first direction in response to a pressing manipulation performed on the input unit; and a vibration generating unit connected to the input unit so as to provide vibration when the manipulation is performed, the vibration generating unit including:
  a vibration generating member having a movable part operable in a second direction crossing the first direction;
  a vibration transmitting member connected to the movable part; and
a base body that holds the vibration generating member,
wherein the vibration generating member includes:
  a first yoke having a first surface orthogonal to the first direction, and a second surface parallel to the first direction;
  a second yoke having a third surface orthogonal to the first direction, and a fourth surface parallel to the first direction, the first yoke facing the second yoke in the first direction such that the first surface faces the third surface with a first gap provided therebetween, and the first yoke facing the second yoke in the second direction such that the second surface faces the fourth surface with a second gap provided therebetween, the second gap being narrower than the first gap;
  a coil provided in a vicinity of at least one of the first yoke and the second yoke, the coil generating magnetism; and
  a support body that movably supports the first yoke such that the first yoke vibrates in the second direction.

2. The input device according to claim 1, wherein in an initial state in which no magnetic force is generated between the first yoke and the second yoke, an amount of second gaps at one location is different from that of another location in the second direction.

3. The input device according to claim 1, wherein, in an initial state in which no magnetic force is generated between the first yoke and the second yoke, an opposing area between the second surface and the fourth surface is greater than an opposing area between the first surface and the third surface.

4. The input device according to claim 3, wherein when a magnetic attractive force is generated between the first yoke and the second yoke, a size of the opposing area between the first surface and the third surface remains the same as that in the initial state in which no magnetic force is generated.

5. The input device according to claim 1, wherein the first yoke and the second yoke have a circular shape in a plan view.

6. The input device according to claim 1, wherein the input unit is connected integrally to the vibration transmitting member.

7. The input device according to claim 1, wherein the first yoke and the second yoke are made of a soft magnetic material.

8. The input device according to claim 1,
wherein the first yoke includes:
  a first ring plate having a first inner circumference and a first outer circumference;
  a first inner wall extending in the first direction from the first inner circumference; and
  a first outer wall extending in the first direction from the first outer circumference,
wherein the second yoke includes:
  a second ring plate having a second inner circumference smaller than the first inner circumference, and a second outer circumference greater than the first outer circumference;
  a second inner wall extending in the first direction from the second inner circumference so as to face the first inner wall; and
  a second outer wall extending in the first direction from the second outer circumference so as to face the first outer wall,
wherein a bottom surface of the first inner wall and a bottom surface of the first outer wall provide the first surface facing a top surface of the second ring plate which provides the third surface,
and wherein surfaces of the first inner wall and the first outer wall facing the second inner wall and the second outer wall, respectively, provide the second surface, while corresponding surfaces of the second inner wall and the second outer wall facing thereto provide the fourth surface.

9. The input device according to claim 1,
wherein the flat-type input unit has a first surface which is the manipulation surface and a second surface opposite to the first surface, the support member supporting the input unit from the second surface side,
and wherein the vibration generating unit is connected to the second surface of the input unit so as to provide vibration in a second direction crossing the first direction when the pressing manipulation is performed on the first surface in the first direction, the vibration transmitting member being connected to the movable part and to the second surface.

* * * * *